A. N. MERRILL.
CLUTCH LOCK.
APPLICATION FILED FEB. 19, 1921.

1,425,404. Patented Aug. 8, 1922.

A. N. Merrill INVENTOR

BY Victor J. Evans ATTORNEY

WITNESS:

UNITED STATES PATENT OFFICE.

ALFRED NILE MERRILL, OF OXFORD, NEW JERSEY.

CLUTCH LOCK.

1,425,404.  Specification of Letters Patent.  Patented Aug. 8, 1922.

Application filed February 19, 1921. Serial No. 446,327.

*To all whom it may concern:*

Be it known that I, ALFRED N. MERRILL, a citizen of the United States, residing at Oxford, in the county of Warren and State of New Jersey, have invented new and useful Improvements in Clutch Locks, of which the following is a specification.

This invention relates to improvements in tractors and has particular relation to means for locking the clutch pedal of a "Fordson" tractor to hold the clutch in disengaged position.

Another object of the invention is the provision of a device of this character, which is simple in construction, positive in operation and which may be readily attached to tractors now in use.

With the above and other objects in view, the invention further includes the following novel features and details of construction, to be hereinafter more fully described, illustrated in the accompanying drawings and pointed out in the appended claim.

In the drawings:—

Figure 1:
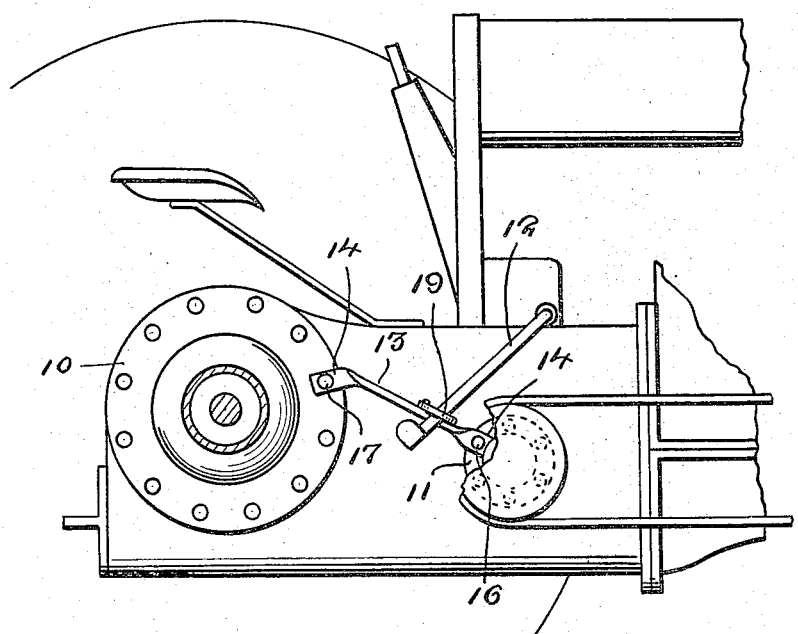
Figure 1 is a side elevation of a "Fordson" tractor with the invention applied, the clutch pedal being shown in locked position by dotted lines.
Figure 2:
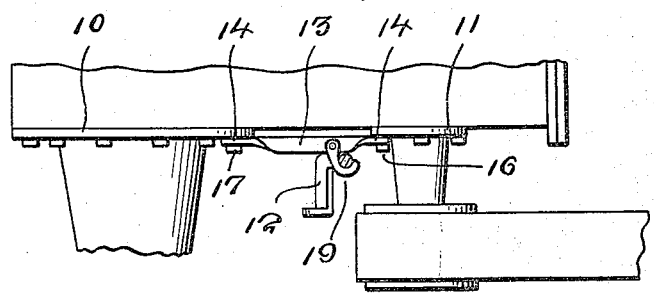
Figure 2 is a fragmentary plan view of the same.
Figure 3:
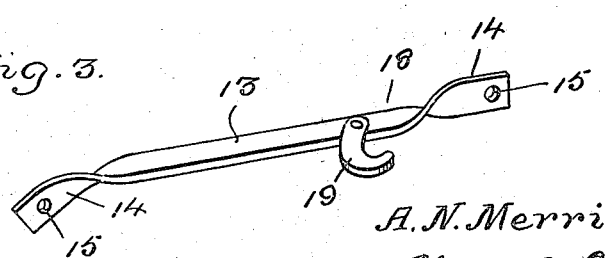
Figure 3 is a detail perspective view of the attachment.

Referring in detail to the drawings, wherein like characters of reference denote corresponding parts, the reference character 10 indicates the differential housing of a "Fordson" tractor and 11 the housing which encloses the belt pulley, while 12 indicates the foot pedal which controls the clutch of the tractor.

In the use of these tractors for the operation of various machines, it is often desired to stop the operation of the machine without also stopping the operation of the tractor engine. As the tractor is equipped with a spring operated clutch, it is necessary to manually hold this clutch in disengaged position in order to effect the purpose just stated. This requires the services of two persons, one for the operation of the machine and the other for holding out the clutch.

It is the purpose of the present invention to overcome this objection by providing means which may be readily secured to the tractor for the purpose of holding the clutch in disengaged position. This means comprises a strip of metal indicated at 13, whose ends are given a quarter turn to provide right angled portions 14 having openings 15 therein. One end of the strip 13 is thus adapted for engagement over one of the bolts 16 of the belt pulley housing and the other for engagement over one of the bolts 17 of the differential housing. The strip may thus be secured in place by merely removing the nuts of these bolts and slipping the said strip in position and readjusting the bolts, so that no means other than those already provided is necessary for securing the device in place. The intermediate portion of the strip 13 presents a substantially flat horizontal surface and pivotally mounted upon this intermediate portion adjacent one end as indicated at 18, is a substantially L-shaped hook 19 which is capable of being extended beyond the side edge of the strip 13. The clutch pedal 12 may thus be manually depressed to disengage the tractor clutch and the hook 19 engaged around the pedal so as to prevent reengagement of the clutch under the influence of the usual clutch spring. This serves to "cut out" the engine, as will be readily understood. In order to reengage the clutch it is only necessary to slightly depress the foot pedal 12 and disengage the hook 19 and permit the reengagement of the clutch in the usual manner.

The invention is susceptible of various changes in its form, proportions and minor details of construction and the right is herein reserved to make such changes as properly fall within the scope of the appended claim.

Having described the invention what is claimed is:—

The combination with a tractor having a bolt secured differential housing, a bolt secured belt pulley housing spaced therefrom and a clutch pedal operating between said housings, of a support formed of a flat strip of metal having its ends bent to provide for contact with the outer vertical faces of the differential and clutch pedal housings and an intermediate substantially horizontal portion, said ends being apertured to receive the bolts of said housings and an L-shaped substantially horizontally movable hook having one end pivotally secured to the support upon the horizontal portion and its other end adapted for engagement with the clutch pedal to hold the latter against movement in one direction.

In testimony whereof I affix my signature.

ALFRED NILE MERRILL.